US011290641B2

(12) United States Patent
Han et al.

(10) Patent No.: US 11,290,641 B2
(45) Date of Patent: Mar. 29, 2022

(54) ELECTRONIC DEVICE AND METHOD FOR CORRECTING IMAGE CORRECTED IN FIRST IMAGE PROCESSING SCHEME IN EXTERNAL ELECTRONIC DEVICE IN SECOND IMAGE PROCESSING SCHEME

(71) Applicant: Samsung Electronics Co., Ltd., Suwon-si (KR)

(72) Inventors: Changsu Han, Suwon-si (KR); Hyunhee Park, Suwon-si (KR); Sungjun Lim, Suwon-si (KR); Youngjo Kim, Suwon-si (KR); Jaegon Kim, Suwon-si (KR); Hongseok Yang, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/275,965

(22) Filed: Feb. 14, 2019

(65) Prior Publication Data

US 2019/0268536 A1    Aug. 29, 2019

(30) Foreign Application Priority Data

Feb. 23, 2018    (KR) .................. 10-2018-0021611

(51) Int. Cl.
*H04N 5/232*    (2006.01)
*H04N 1/00*    (2006.01)
*H04N 1/32*    (2006.01)

(52) U.S. Cl.
CPC ..... *H04N 5/23229* (2013.01); *H04N 1/00209* (2013.01); *H04N 1/00244* (2013.01);
(Continued)

(58) Field of Classification Search
CPC ... H04N 2201/0084; H04N 2201/0086; H04N 5/23235; H04N 5/23293; H04N 9/64;
(Continued)

(56) References Cited

U.S. PATENT DOCUMENTS 8,538,149 B2    9/2013    Iwasaki
9,600,853 B2    3/2017    Jang
(Continued)

FOREIGN PATENT DOCUMENTS

JP    2007-215001 A    8/2007
JP    6136086 B2    5/2017
(Continued)

OTHER PUBLICATIONS

International Search Report dated Jun. 3, 2019, issued in International Patent Application No. PCT/KR2019/001840.
(Continued)

*Primary Examiner* — Nhan T Tran
*Assistant Examiner* — Tuan H Le
(74) *Attorney, Agent, or Firm* — Jefferson IP Law, LLP

(57) ABSTRACT

An electronic device is provided. The electronic device includes a communication module, a memory, a display, and a processor, wherein the processor may confirm a user input related to selection of an image corrected by using a first image processing scheme, transmit attribute information related to the first image processing scheme to an external electronic device through the communication module, based on the user input, receive, from the external electronic device through the communication module, the image corrected by using a second image processing scheme selected based on the attribute information in the external electronic device, and display, through the display, the image corrected by using the second image processing scheme.

17 Claims, 14 Drawing Sheets

(52) U.S. Cl.
CPC ..... *H04N 1/32106* (2013.01); *H04N 5/23293* (2013.01); *H04N 2201/0084* (2013.01); *H04N 2201/0086* (2013.01)

(58) Field of Classification Search
CPC ............... H04N 5/23203; H04N 19/37; H04N 5/23245; G06T 5/001; G06T 7/11; G06K 9/00664
See application file for complete search history.

(56) References Cited

U.S. PATENT DOCUMENTS

| | | | |
|---|---|---|---|
| 9,712,725 | B2 | 7/2017 | Ogikubo |
| 10,037,070 | B2 | 7/2018 | Wang et al. |
| 10,178,342 | B2 | 1/2019 | Uemura |
| 10,218,881 | B2 | 2/2019 | Ogikubo |
| 2008/0158612 | A1 | 7/2008 | Iwasaki |
| 2013/0106884 | A1* | 5/2013 | Fleegal ............. G09G 5/39 345/545 |
| 2015/0161755 | A1* | 6/2015 | Jang ............. G06T 1/20 345/503 |
| 2015/0222792 | A1 | 8/2015 | Ogikubo |
| 2016/0027180 | A1* | 1/2016 | Iyer ............. G06T 7/11 382/195 |
| 2017/0078562 | A1 | 3/2017 | Chen et al. |
| 2017/0199563 | A1 | 7/2017 | Wang et al. |
| 2017/0244655 | A1* | 8/2017 | Moon ............. H04L 12/185 |
| 2017/0264855 | A1 | 9/2017 | Uemura |
| 2017/0272622 | A1 | 9/2017 | Ogikubo |
| 2017/0344543 | A1* | 11/2017 | Ata ............. G06F 16/51 |
| 2018/0101971 | A1* | 4/2018 | Balasubramanian ... G06T 11/60 |
| 2018/0131920 | A1* | 5/2018 | Kim ............. H04N 13/344 |
| 2018/0336666 | A1 | 11/2018 | Kim et al. |

FOREIGN PATENT DOCUMENTS

| | | |
|---|---|---|
| JP | 2017-163307 A | 9/2017 |
| WO | 2018/216992 A1 | 11/2018 |

OTHER PUBLICATIONS

Extended European Search Report dated Nov. 11, 2020, issued in European Patent Application No. 19757633.3.

* cited by examiner

ELECTRONIC DEVICE AND METHOD FOR CORRECTING IMAGE CORRECTED IN FIRST IMAGE PROCESSING SCHEME IN EXTERNAL ELECTRONIC DEVICE IN SECOND IMAGE PROCESSING SCHEME

CROSS-REFERENCE TO RELATED APPLICATION(S)

This application is based on and claims priority under 35 U.S.C. § 119(a) of a Korean patent application number 10-2018-0021611, filed on Feb. 23, 2018, in the Korean Intellectual Property Office, the disclosure of which is incorporated by reference herein in its entirety.

BACKGROUND

1. Field

The disclosure relates to an electronic apparatus and method for correcting an image corrected in a first image processing scheme in an external electronic device in a second image processing scheme.

2. Description of Related Art

An electronic device may acquire a raw image through an image sensor. The electronic device may process the acquired raw image by using an embedded image signal processor (ISP). The ISP may provide an image with improved quality by processing the received raw image using an image enhancement algorithm. The ISP may perform various processes such as a white balance adjustment, a color adjustment (e.g., color matrix, color correction, color enhancement, and the like), color filter array (CFA) interpolation, noise reduction processing or sharpening, image enhancement (e.g., high-dynamic-range (HDR), face detection, and the like), and the like. The image output from the ISP may be compressed, and the compressed image (e.g., an image in joint photographic experts group (JPEG) format) may be stored in the electronic device.

The above information is presented as background information only to assist with an understanding of the disclosure. No determination has been made, and no assertion is made, as to whether any of the above might be applicable as prior art with regard to the disclosure.

SUMMARY

The electronic device may use a cloud system to provide an image backup function and a new media content creation function to a user. The cloud system may process an image by applying computer-based techniques, such as image matching, which are difficult to be performed on the electronic device. For example, the cloud system may perform image recognition by using machine learning-based software.

As technology has been developed, an image processing scheme of processing an image may continue to evolve. For example, the image processing scheme may be based on the performance of a hardware device such as an image signal processor (ISP), or software performance such as an algorithm. To use the advanced image processing scheme, the electronic device may have to be equipped with a new hardware device. In order for an electronic device to be equipped with a new hardware device, it is necessary to consider an increase in chip price, heat generation, or a mounting space.

Aspects of the disclosure are to address at least the above-mentioned problems and/or disadvantages and to provide at least the advantages described below. Accordingly, an aspect of the disclosure is to provide an electronic device capable of correcting an image using an image processing scheme supported by an external electronic device such as a cloud server.

Another aspect of the disclosure is to provide an electronic device capable of receiving a corrected image from an external electronic device while the image is being displayed through a display and providing a user with the effect of correcting the image displayed based on the received image.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a memory, a display, and a processor, wherein the processor is configured to confirm a user input related to selection of a first image corrected by using a first image processing scheme, transmit attribute information related to the first image processing scheme to an external electronic device through the communication module, based on the user input, receive, from the external electronic device through the communication module, a second image corrected by using a second image processing scheme selected based on the attribute information in the external electronic device, the received second image corresponding to the selected first image, and display, through the display, a third image corresponding to the selected first image, wherein the third image is an image corrected based on at least one of the first image processing scheme or the second image processing scheme.

In accordance with another aspect of the disclosure, an electronic device is provided. The electronic device includes a communication module, a memory, a display, and a processor, wherein the processor is configured confirm an input related to selection of an image corrected by using a first image processing scheme, transmit attribute information related to the first image processing scheme to the external electronic device through the communication module to determine whether the external electronic device is capable of correcting, by using a second image processing scheme at least partially different from the first image processing scheme, an original image corresponding to the image corrected by using the first processing scheme, based on the attribute information, receive, from the external electronic device through the communication module, at least a part of the original image corrected by using the second image processing scheme, based on the determination that the external electronic device is capable of correcting the original image by using the second image processing scheme, and display, through the display, the image corrected by using the second image processing scheme.

In accordance with another aspect of the disclosure, an external electronic device is provided. The external electronic device includes a memory, and a processor, wherein the processor is configured to receive attribute information related to a first image processing scheme from an electronic device, correct an original image by using a second image processing scheme based on the attribute information, and transmit the image corrected by using the second image processing scheme to the electronic device, and wherein the first and second image processing schemes may be based on a type of an ISP for correcting the image.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
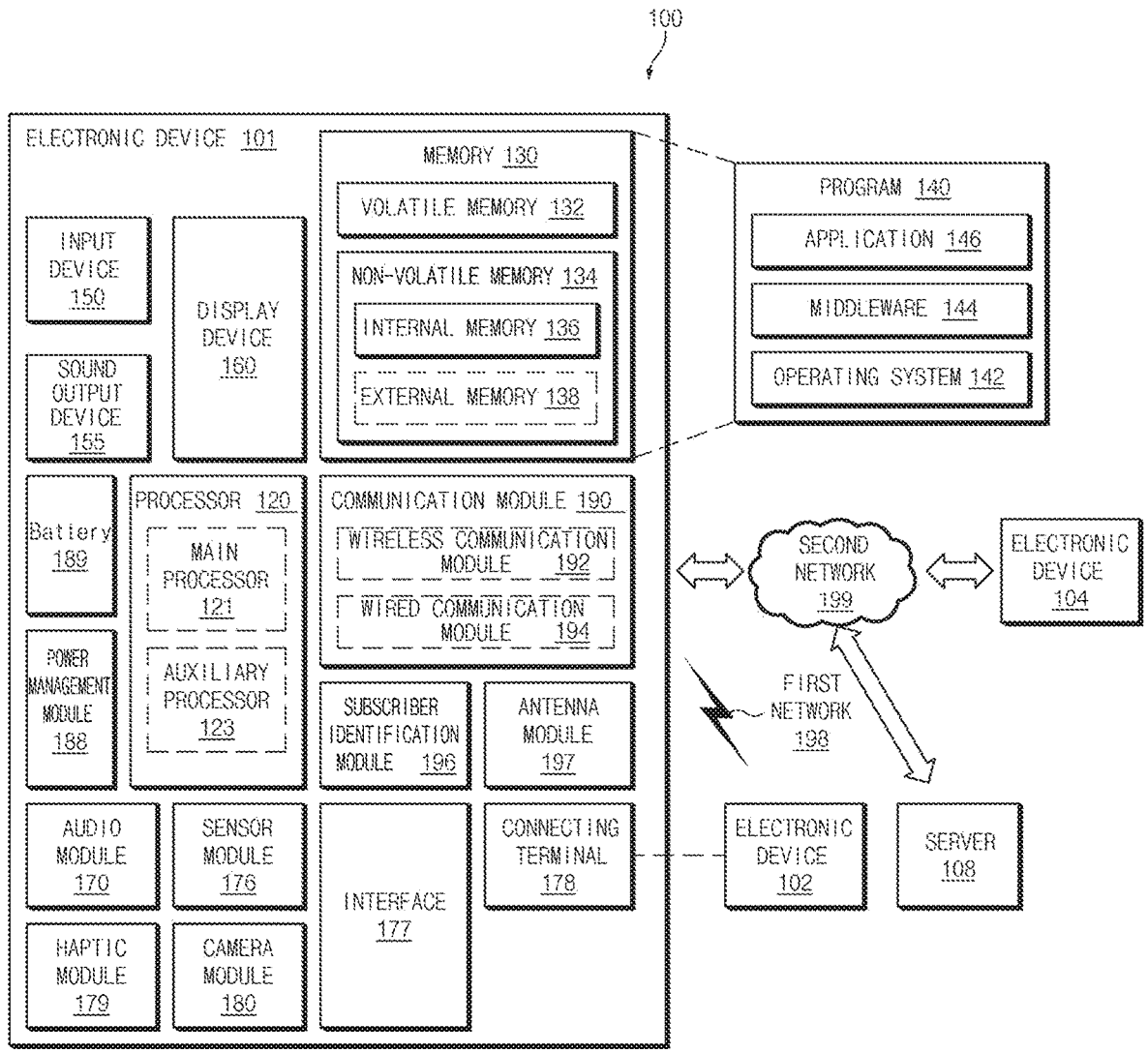
FIG. 1 is a block diagram illustrating an electronic device in a network according to an embodiment of the disclosure.

FIG. 1 is a block diagram illustrating an electronic device in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
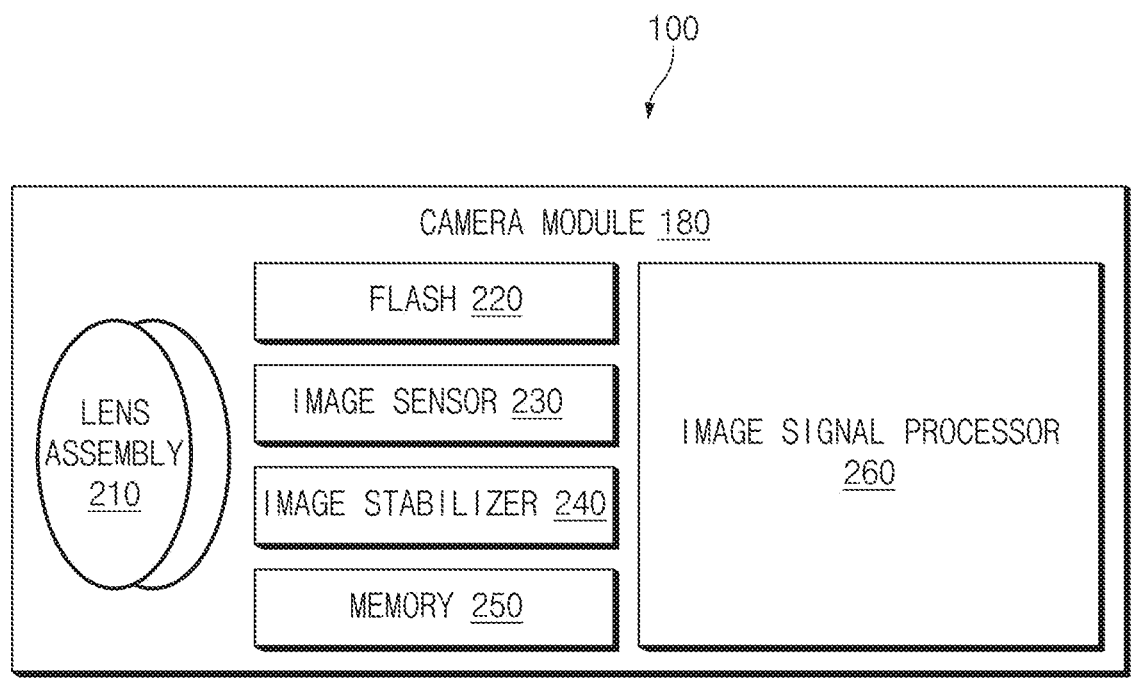
FIG. 2 is a block diagram illustrating a camera module according to an embodiment of the disclosure.

FIG. 2 is a block diagram illustrating a camera module according to an embodiment of the disclosure.

Referring to FIG. 2, the camera module 180 may include a lens assembly 210, a flash 220, an image sensor 230, an image stabilizer 240, memory 250 (e.g., buffer memory), or an ISP 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an IR LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the ISP 260. According to an embodiment, the memory 250 may be configured as at least part of the memory 130 or as a separate memory that is operated independently from the memory 130.

The ISP 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 260 may perform control (e.g., exposure time control or read-out timing control) with respect to at least one (e.g., the image sensor 230) of the components included in the camera module 180. An image processed by the ISP 260 may be stored back in the memory 250 for further processing, or may be provided to an external component (e.g., the memory 130, the display device 160, the electronic device 102, the electronic device 104, or the server 108) outside the camera module 180. According to an embodiment, the ISP 260 may be configured as at least part of the processor 120, or as a separate processor that is operated independently from the processor 120. If the ISP 260 is configured as a separate processor from the processor 120, at least one image processed by the ISP 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
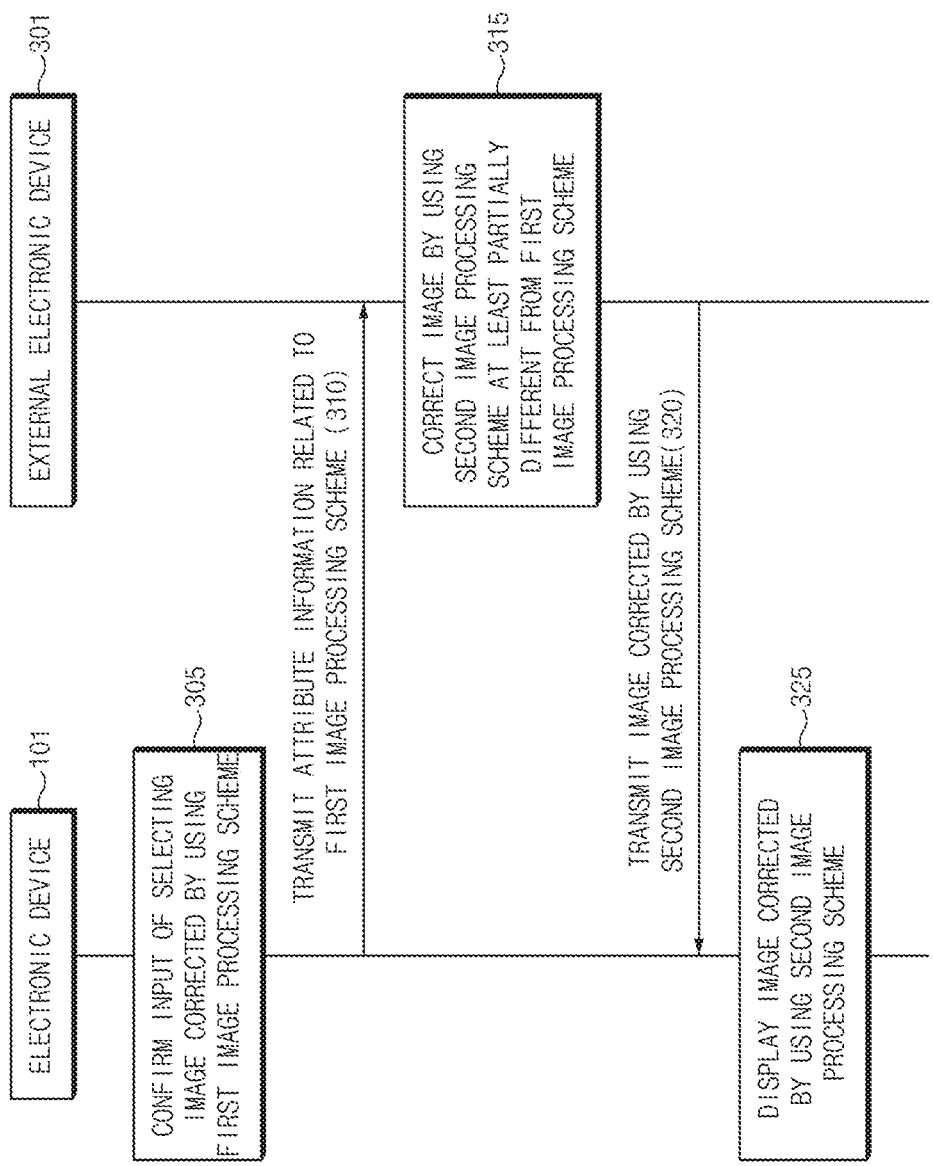
FIG. 3 is a flowchart illustrating the operations of an electronic device and an external electronic device for providing an image corrected by an image processing scheme of an external electronic device according to an embodiment of the disclosure.

FIG. 3 is a flowchart illustrating the operations of an electronic device and an external electronic device for providing an image corrected by an image processing scheme of the external electronic device according to an embodiment of the disclosure.

Referring to FIG. 3, the electronic device 101 (e.g., the electronic device 101 of FIG. 1) may refer to an apparatus that acquires a raw image through an image sensor. For example, the electronic device 101 may include a smart phone, a tablet, a wearable device, a home appliance, or a digital camera. The electronic device 101 may process a raw image obtained using a processor (e.g., the processor 120 of FIG. 1 or the ISP 260 of FIG. 2) embedded in the electronic device 101. Hereinafter, the image processing scheme supported by the electronic device 101 in the disclosure may be referred to as a first image processing scheme. The image processing scheme may include hardware or software techniques for processing the raw image. For example, the image processing scheme may be based on at least one of a type of a processor (e.g., an ISP), a type of a recognition module, a type of an encoder, and a type of a preprocessing unit.

An external electronic device 301 may refer to a device that is wired or wirelessly connected to the electronic device 101. For example, in FIG. 1, the external electronic device 301 may refer to the electronic device 102 or the server 108 that communicates with the electronic device 101 through wired or short-range wireless communication, or the electronic device 102 or the server 108 that communicates with the electronic device 101 through long-range wireless communication. The external electronic device 301 may process a raw image or a small raw image obtained from the electronic device 101. Hereinafter, the image processing scheme supported by the external electronic device 301 in the disclosure may be referred to as a second image processing scheme. The first and second image processing schemes may be the same as or at least partially different from each other. For example, the external electronic device 301 may include a cloud server or a computing device of processing images.

In operation 305, the electronic device 101 (e.g., the processor 120 of FIG. 1 or the ISP 260 of FIG. 2) may confirm a user input of selecting the image corrected by using the first image processing scheme. For example, the image may include a picture, a video, or a still image included in the video. The image corrected using the first image processing scheme may be, for example, an image in in joint photographic experts group (JPEG) format. The electronic device 101 may receive an input of selecting a thumbnail of an image stored in the electronic device 101.

In operation 310, the electronic device 101 may transmit the attribute information associated with the first image processing scheme to the external electronic device 301. For example, the attribute information may include at least one of the information shown in Table 1.

TABLE 1

| Attribution information | Value |
| --- | --- |
| Image file ID | ID_20180108_2215 |
| Processor version | V1.0 |
| Camera manufacturer | Samsung |
| Camera model name | SM-G9305 |
| Photographing date | 2018-01-18 18:02:05 |
| Photographing mode | Normal |
| Exposure mode | Auto |
| Photograph rotation | Normal |
| Photometric mode | Average |
| ISO information | 50 |
| Exposure time | 1/425 sec |
| F Number | F/1.7 |
| Format of raw image | RGB Bayer |
| Image size | 4032 × 2268 |
| Maximum F-number | F/1.7 |
| Focal length | 4.2 mm |
| White balance | Auto |
| Use of flash | Off |
| [TBD] | [—] |

The values of the attribute information shown in Table 1 are merely illustrative, and the embodiments disclosed in the disclosure are not limited to the values shown in Table 1. In Table 1, the processor version may include, for example, a type (or version) of an ISP, an encoder included in a processor, or a type of a preprocessing unit or a recognition module. The electronic device 101 may display, on the display device of the electronic device 101 (e.g., the display device 160 of FIG. 1), an image corresponding to a thumbnail selected before or after transmitting the attribute information associated with the first image processing scheme.

In operation 315, the external electronic device 301 may correct an image by using the second image processing scheme that is at least partially different from the first image processing scheme. For example, the ISP type of the external electronic device 301 may be different from that of the electronic device 101. As another example, the type of the encoder, preprocessor, or recognition module of the external electronic device 301 may be different from that of the encoder, preprocessor, or recognition module of the electronic device 101. The external electronic device 301 may compare the first image processing scheme with the second image processing scheme based on the attribute information, and when the second image processing scheme is at least partially different from the first image processing scheme, may correct the image by using the second image processing scheme.

In operation 320, the external electronic device 301 may transmit, to the electronic device 101, the image corrected by using a second image processing scheme. For example, the corrected image may be an image in the JPEG format. When the wired or wireless link between the external electronic device 301 and the electronic device 101 is disconnected, until the connection between the external electronic device 301 and the electronic device 101 is established again, the external electronic device 301 may store the corrected image in a queue list. After transmitting the corrected image, the external electronic device 301 may delete an image stored in the external electronic device 301 to secure storage space.

In operation 325, the electronic device 101 may display the image corrected by using the second image processing scheme on the display. Through the above-described scheme, the electronic device 101 may provide the corrected image to a user through the external electronic device 301 without a need to be equipped with a separate hardware device supporting the latest image processing scheme (e.g., the second image processing scheme) or to modify an algorithm.

Figure 4:
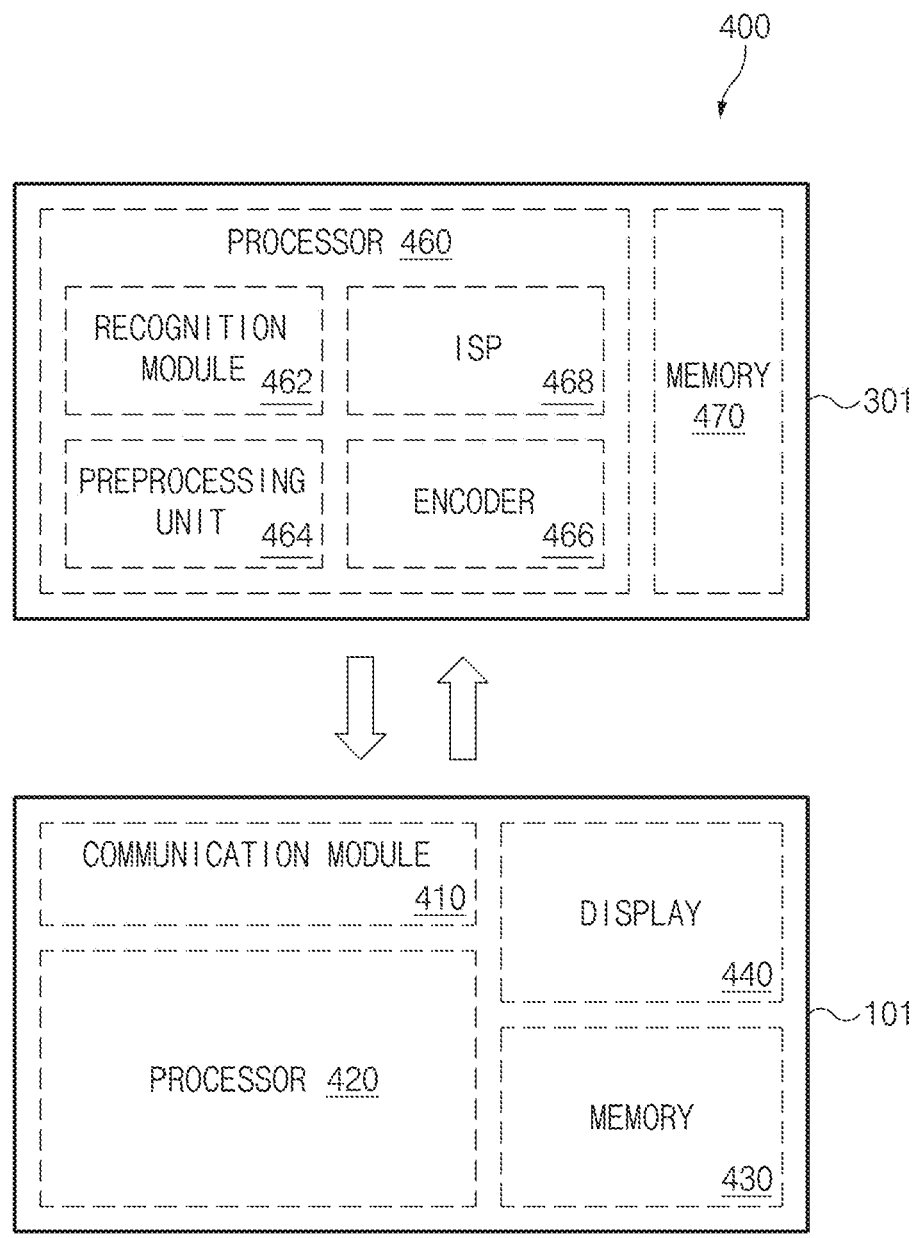
FIG. 4 is a block diagram illustrating an electronic device and an external electronic device for providing an image corrected by an image processing scheme of the external electronic device according to an embodiment of the disclosure.

FIG. 4 is a block diagram illustrating an electronic device and an external electronic device for providing an image corrected by an image processing scheme of the external electronic device according to an embodiment of the disclosure.

Referring to FIG. 4, a network environment 400 (e.g., the network environment 100 of FIG. 1) may include the electronic device 101 (e.g., the electronic device 101 of FIG. 3) and the external electronic device 301 (the external electronic device 301 of FIG. 3). The electronic device 101 and the external electronic device 301 may perform wired or wireless communication. According to an embodiment of the disclosure, the electronic device 101 may include a portable device such as a smart phone, and the external electronic device 301 may include a cloud server. According to another embodiment, the electronic device 101 may be connected to the external electronic device 301 corresponding to a computing device through a separate docking device or a USB terminal.

The electronic device 101 may include a communication module 410 (e.g., the communication module 190 of FIG. 1), a processor 420 (e.g., the processor 120 of FIG. 1 or the ISP 260 of FIG. 1), a memory 430 (e.g., the memory 130 of FIG. 1 or the memory 250 of FIG. 2), and a display 440 (e.g., the display device 160 of FIG. 1). The electronic device 101 may further include at least one component in addition to the components shown in FIG. 4. For example, the electronic device 101 may include at least one of an image sensor (e.g., the image sensor 230 of FIG. 2) for acquiring a raw image, an input device (e.g., the input device 150 of FIG. 1) for receiving a user input, and a connecting terminal (e.g., a USB connector) used to connect physically to the external electronic device 301.

The communication module 410 may process a signal transmitted to or received from the external electronic device 301. The display 440 may display an image.

The processor 420 may be operatively coupled to the communication module 410, the memory 430, and the display 440 to perform the overall function of the electronic device 101. For example, the processor 420 may include one or more processors. The one or more processors may include, for example, an ISP, AP, or a CP.

The processor 420 may obtain a raw image of a subject through an image sensor (not shown). For example, the processor 420 may obtain a row image that is represented by one of colors R/G1/G2/B and represented by 8 to 16 bits-depth. As another example, the processor 420 may obtain a Bayer image processed by a color filter array (CFA) pattern. As still another example, the processor 420 may obtain a row image of a layer structure capable of sensing three colors in one pixel. As still another example, the processor 420 may obtain a row image of a dual pixel (DP) structure that includes different parallax information or phase difference information in one pixel. The processor 420 may obtain two or more row images through two or more image sensors which are the same as or different from each other. For example, the two or more image sensors may include a dual sensor (e.g., RGB+RGB, RGB+mono, or wide+tele) or an array sensor. The processor 420 may obtain metadata of an image. For example, the metadata may include at least one of an image file identifier (ID), a photographing date, a photographing mode, an exposure mode, a photograph rotation, a photometric mode, ISO information, exposure time, an F-number, an image size, the maximum aperture value, a focal length, a white balance, and flash use of the attribute information shown in Table 1.

The processor 420 may process the obtained raw image. The processor 420 may process (or correct) the raw image by using the first image processing scheme. For example, the processor 420 may compensate for lens distortion in the raw image, or may remove at least some of noise. As another example, the processor 420 may perform white balance adjustment, color adjustment, CFA interpolation, sharpening, or image enhancement. As still another example, the processor 420 may perform down scaling, down sampling, or compression to reduce the data size of the raw image. A down-scaled or down-sampled raw image may be referred to as a small raw image. The processor 420 may compress the raw image or the small row image and transmit the compressed image to the external electronic device 301 through the communication module 410. The processor 420 may separately transmit the raw image and the small raw image to the external electronic device 301. Since the row image has a larger capacity than the small row image, the processor 420 may transmit the row image after transmitting the small row image.

The processor 420 may receive a user input of selecting the image corrected by using the first image processing scheme. For example, the processor 420 may display a thumbnail of an image through a gallery in which at least one image file is stored, and may receive a user input of selecting one of the displayed thumbnails.

The processor 420 may receive an image corrected by using the second image processing scheme through the communication module 410 from the external electronic device 301. For example, the processor 420 may receive the image, which is corrected by using the second image processing scheme, for each segmented image area. As another example, the processor 420 may receive a difference image between the image corrected by using the first image processing scheme and the image corrected by using the second image processing scheme. As still another example, to reduce the time and resource consumption caused by image transmission, the processor 420 may not receive the image corrected by the external electronic device 301 as it is, but may receive an image, which is resized to match with the size of the display 440, from the external electronic device 301. The processor 420 may display the corrected image through the display 440. For example, the corrected image may mean an image in the JPEG format. The processor 420 may display the image corrected by using the first or second image processing scheme through the display 440.

The processor 420 may confirm whether the first and second image processing schemes are the same. For example, the processor 420 may receive the attribute information related to the second image processing scheme from the external electronic device 301 through the communication module 410, and may confirm whether the first and second image processing schemes are the same. When the first and second image processing schemes are the same, the processor 420 may not receive an image from the external electronic device 301 to reduce power consumption caused due to data transmission. As another example, the processor 420 may transmit the attribute information about the first image processing scheme to the external electronic device 301 through the communication module 410, and may receive, from the external electronic device 301, a message indicating whether the first and second image processing schemes are the same.

The processor 420 may confirm whether the image selected by the user input is stored in the memory 430. When the image is not stored in the memory 430, the processor 420 may request the image by transmitting the metadata on the selected image through the communication module 410 to the external electronic device 301.

The processor 420 may store data in the memory 430 or may read out the data from the memory 430. According to an embodiment, the processor 420 may execute instructions stored in the memory 430.

The memory 430 may store instructions that are used by the processor 420 to control the components of the electronic device 101. For example, the memory 430 may include a non-volatile memory or a volatile memory. The memory 430 may store a raw image, an image by corrected using the first image processing scheme, attribute information related to the first image processing scheme, an image corrected by using the second image processing scheme, and a difference image between the images corrected by using the first and second image processing schemes.

The external electronic device 301 may include a processor 460 and a memory 470. The external electronic device 301 may further include at least one additional component in addition to the components shown in FIG. 4. For example, the external electronic device 301 may include a communication module or a connecting terminal for performing communication with the electronic device 101. According to an embodiment, the components of the external electronic device 301 may be the same entity or may constitute separate entities.

The processor 460 may perform an overall function for processing a raw image or a small raw image received from the electronic device 101. For example, the processor 460 may be at least one processor. The processor 460 may include a recognition module 462, a preprocessing unit 464, an encoder 466, and an ISP 468. The components included in the processor 460 may be controlled by one processor or may be respectively implemented by a plurality of processors.

The processor 460 may support the second image processing scheme. The second image processing scheme may be the same as or at least partially different from the first image processing scheme. For example, the version of the ISP 468 included in the processor 460 may be higher than the version of the ISP included in the processor 420. The processor 460 may support both the first and second image processing schemes. The processor 460 may generate the difference image between the images corrected by using the first and second processing schemes.

The preprocessing unit 464 may perform at least one of decompression, image enhancement, de-mosaic processing, or image format changing before transmitting the raw image to the recognition module 462 or the ISP 468.

The recognition module 462 may perform an algorithm for analyzing information associated with an image from the image (e.g., a raw image or a small raw image). The recognition module 462 may be a logical module and may be implemented with the processor 460. For example, the recognition module 462 may analyze object recognition, face recognition, velocity vectors, segmentation, and scene parsing. The recognition module 462 may generate recipe information based on information associated with the image. For example, the recipe information may include a segment, a layer, a vector, or a scene category. The recognition module 462 may transmit the recipe information to the ISP 468.

The ISP 468 may perform image processing (or image correction) on the raw image by using the recipe information received from the recognition module 462. The ISP 468 may correct the image by using the second image processing scheme. For example, the ISP 468 may perform white balance adjustment, color adjustment, CFA interpolation, sharpening, or image enhancement by using the recipe information. According to an embodiment, the ISP 468 may perform image correction by using additional information (e.g., a feature vector) stored in the memory 470. The corrected image may, for example, have a YUV format. The ISP 468 may correct the image for each of the segmented image areas.

The encoder 466 may generate an image file (e.g., JPEG, moving picture experts group (MPEG), or 360-degree image) by encoding an image. The image file may include a picture, a video, or a still image included in the video.

The memory 470 may refer to one or more memories for storing data. The memory 470 may store a row image, an image corrected by using the second image processing scheme, or attribute information related to the second image processing scheme.

Figure 5:
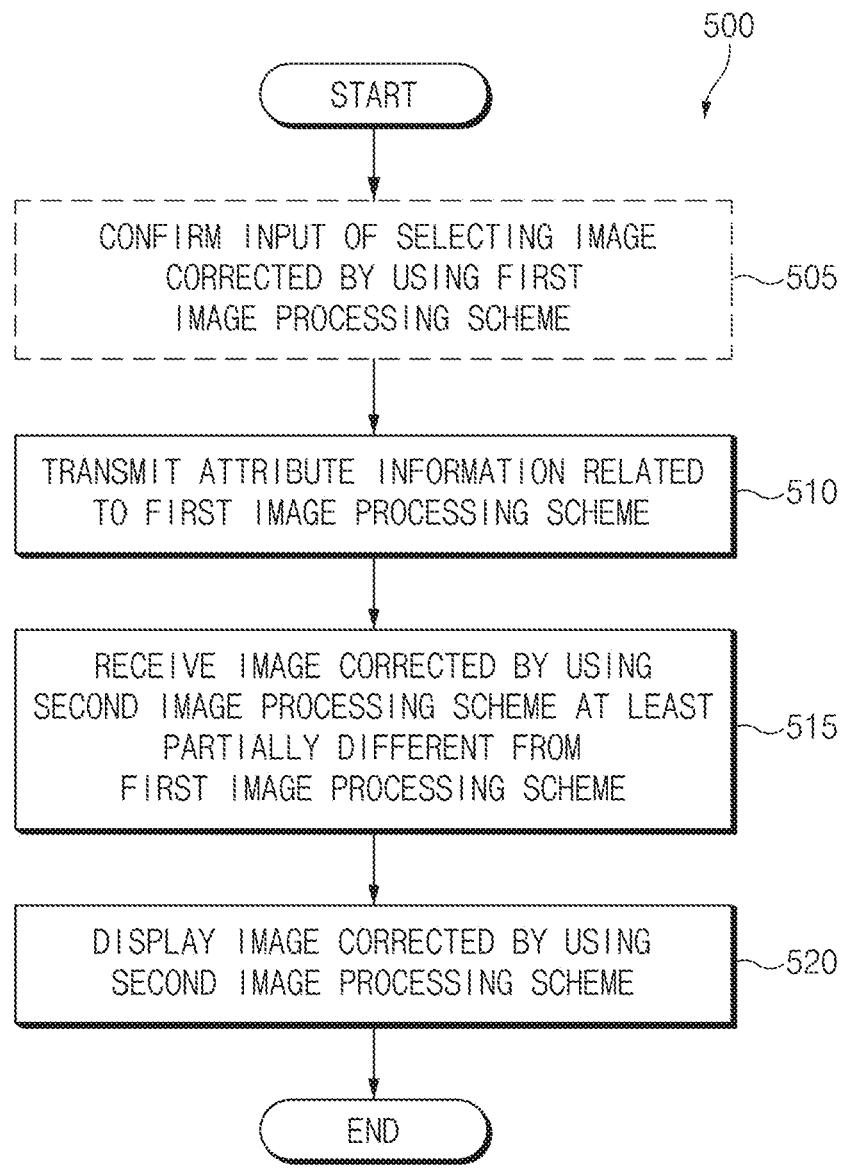
FIG. 5 is a flowchart illustrating an operation of an electronic device for providing an image corrected by an image processing scheme of an external electronic device according to an embodiment of the disclosure.

FIG. 5 is a flowchart illustrating an operation of an electronic device for providing an image corrected by an image processing scheme of an external electronic device according to an embodiment of the disclosure. The operations illustrated in FIG. 5 may be performed by the electronic device 101 or a component (e.g., the processor 420) of the electronic device 101.

Referring to FIG. 5, in operation 505 of a method 500, the processor 420 may confirm a user input of selecting an image corrected by using the first image processing scheme. For example, the processor 420 may receive a user input of selecting a thumbnail from a gallery in which a plurality of image files are stored.

In operation 510, the processor 420 may transmit the attribute information related to the first image processing scheme to the external electronic device 301. For example, the attribute information may include at least one of the information shown in Table 1. The processor 420 may display, through the display 440, a user interface (UI) for confirming whether to transmit the attribute information before transmitting the attribute information. For example, when a space of the memory 430 is below a specified threshold, the processor 420 may display the memory state through the display 440 and may display a UI for confirming whether to transmit the attribute information. As another example, when the network between the electronic device 101 and the external electronic device 301 is disconnected, the processor 420 displays, through the display 440, a UI of requesting a network connection before transmitting the attribute information.

The processor 420 may perform operation 510 without performing operation 505. For example, the processor 420 may obtain an image of a subject through a camera module (or an image sensor) embedded in the electronic device 101, and after correcting the obtained image by using the first image processing scheme, may transmit the attribute information to the external electronic device 301.

In operation 515, the processor 420 may receive, from the external electronic device 301, the image corrected by using the second image processing scheme at least partially different from the first image processing scheme. The ISP version of the electronic device 101 may be different from the ISP version of the external electronic device 301.

In operation 520, the processor 420 may display, through the display 440, the image corrected by using the second image processing scheme. The processor 420 may receive the image corrected by using the second image processing scheme while the image corrected by using the first image processing scheme is displayed through the display 440. In this case, the processor 420 may display, through the display 440, a visual effect of correcting the displayed image by using the second image processing scheme.

Figure 6:
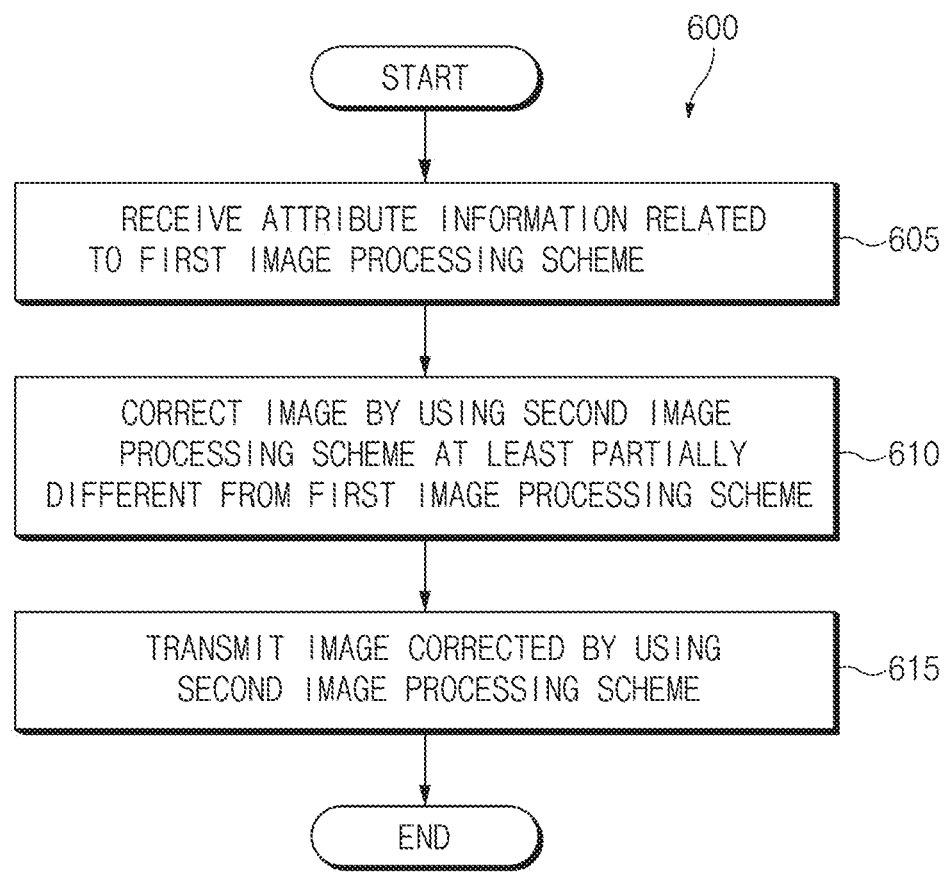
FIG. 6 is a flowchart illustrating an operation of an external electronic device for providing an image corrected by an image processing scheme of an external electronic device according to an embodiment of the disclosure.

FIG. 6 is a flowchart illustrating an operation of an external electronic device for providing an image corrected by an image processing scheme of an external electronic device according to various embodiments of the disclosure. The operations illustrated in FIG. 6 may be performed by the external electronic device 301 or a component (e.g., the processor 460) of the external electronic device 301. Hereinafter, the operations illustrated in FIG. 6 may refer to operations after the external electronic device 301 has received a raw image or a small raw image from the electronic device 101.

Referring to FIG. 6, in operation 605 of a method 600, the processor 460 may receive the attribute information associated with the first image processing scheme from electronic device 101. The attribute information may include at least one of the information shown in Table 1.

In operation 610, the processor 460 may correct the image by using the second image processing scheme at least partially different from the first image processing scheme. The processor 460 may correct the raw image or the small raw image received from the electronic device 101 by using the second image processing scheme.

The processor 460 may correct the image for each segmented image area. For example, the processor 460 may recognize at least one image area from the raw image by segmenting the raw image through the recognition module 462. The recognition module 462 may recognize at least one image area from the raw image by using an object recognition algorithm, a texture recognition algorithm, or a recognition algorithm using machine learning. The processor 460 may perform correction for at least one image area recognized through the ISP 468.

In operation 615, the processor 460 may transmit, to the electronic device 101, the image corrected by using the second image processing scheme. For example, the corrected image may mean an image in the JPEG format. When the network connection between the external electronic device 301 and the electronic device 101 is disconnected, the external electronic device 301 may store the corrected image in the queue list. After transmitting the corrected image, the processor 460 may delete the corrected image from the memory 470 to secure storage space.

Figure 7A:
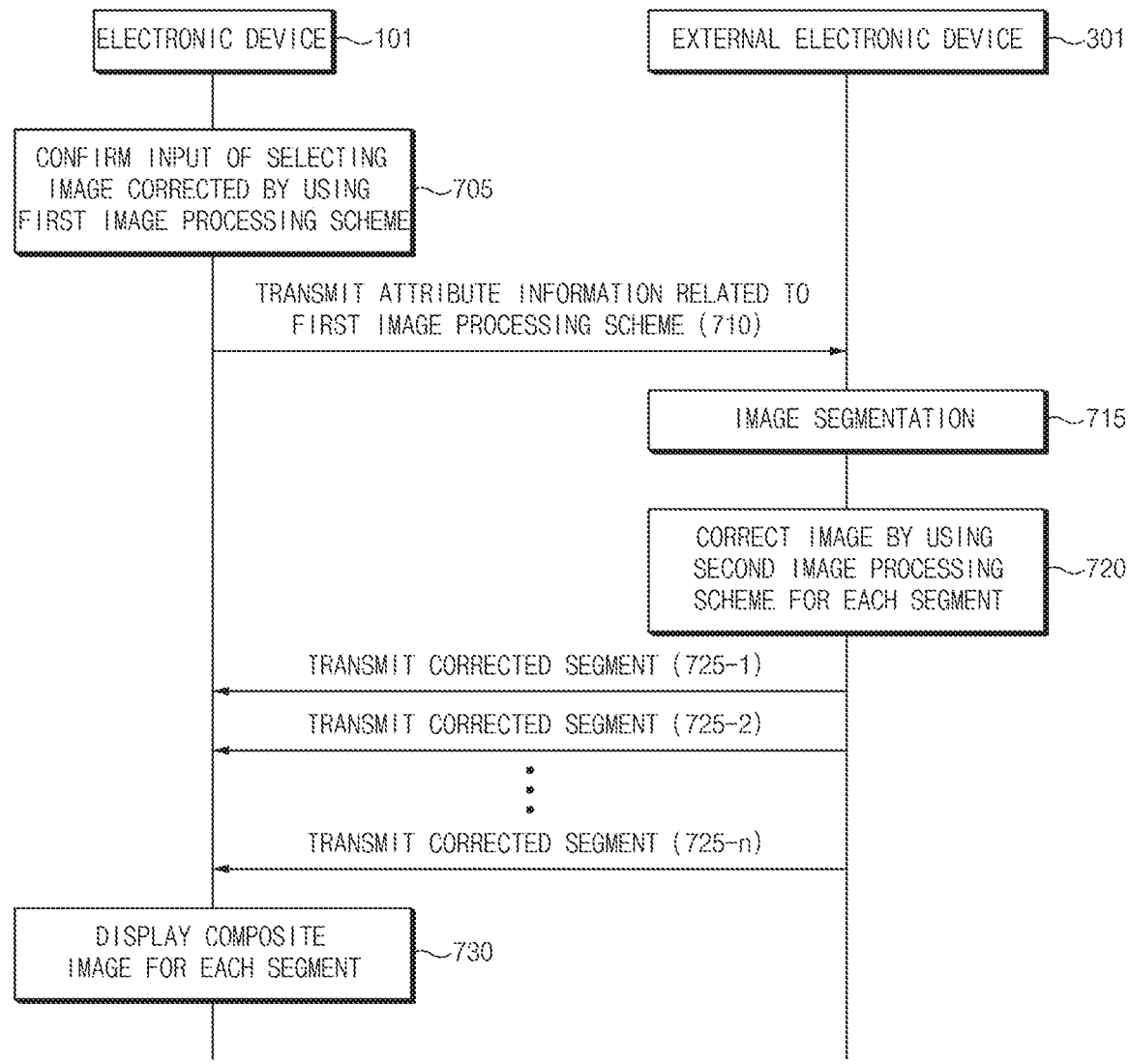
FIG. 7A is a flowchart illustrating an operation of an electronic device and the external electronic device for providing an image corrected by an image processing scheme of an external electronic device for each segmented image area according to an embodiment of the disclosure.
Figure 7B:
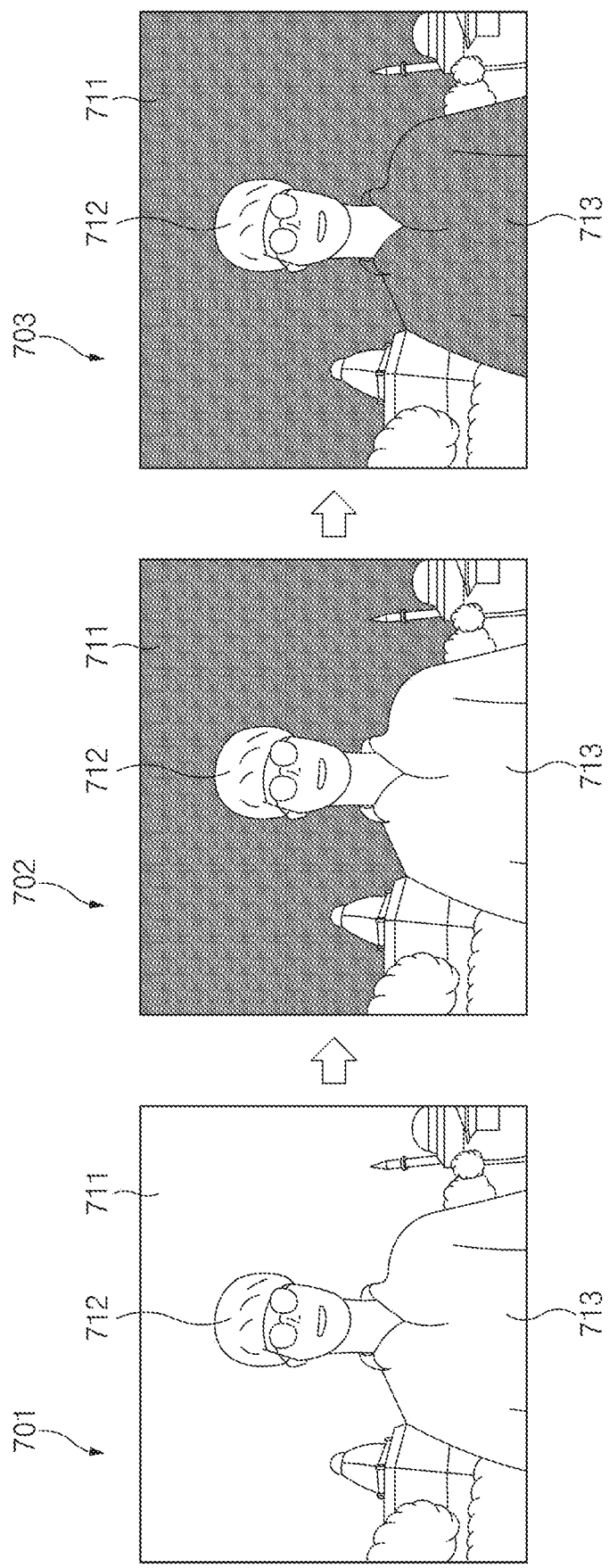
FIG. 7B is a view illustrating an operation of explaining an image corrected for each segmented image area are according to an embodiment of the disclosure.

FIG. 7A is a flowchart illustrating an operation of an electronic device and an external electronic device for providing an image corrected by an image processing scheme of an external electronic device for each segmented image area and the external electronic device according to an embodiment of the disclosure. The embodiment of FIG. 7A may be described with reference to FIG. 7B. FIG. 7B is a view illustrating an operation of explaining an image corrected for each segmented image area according to an embodiment of the disclosure.

Referring to FIG. 7A, in operation 705, the electronic device 101 may confirm an input of selecting an image corrected by using the first image processing scheme. In operation 710, the electronic device 101 may transmit the attribute information associated with the first image processing scheme to the external electronic device 301.

In operation 715, the external electronic device 301 may segment the image into at least one image area (or segment). The external electronic device 301 may recognize each of the at least one segmented image area.

In operation 720, the external electronic device 301 may correct the image for each recognized image area by using the second image processing scheme. The external electronic device 301 may simultaneously or sequentially correct the segmented image areas.

In operations 725-1 to 725-n, the external electronic device 301 may transmit at least some of the corrected segments to the electronic device 101. The external electronic device 301 may transmit the segments simultaneously or sequentially.

In operation 730, the electronic device 101 may display, through the display 440, the composite image of the received at least one segment and the image corrected by the first image processing scheme. The electronic device 101 may sequentially synthesize the received at least one segment, or synthesize all or part of the at least one segment. As described above, the electronic device 101 may provide the effect of correcting the image for each segmented image area.

For example, referring to FIG. 7B, reference numeral 701 may represent an image corrected by using the first image processing scheme. Reference numeral 702 may represent an image in which an image area representing a background subject 711 is corrected by using the second image processing scheme. Reference numeral 703 may represent an image in which an image area representing the background subject 711 and an image area representing a foreground subject 713 are corrected by using the second image processing scheme. The processor 420 may sequentially receive, from the external electronic device 301, the image area in which the image area representing the background subject 711 is corrected, and the image in which the image area representing a foreground subject 712 is corrected, and the image in which the image area representing a foreground subject 713 is corrected. When the image in which the image area representing the background subject 711 is corrected is received, as indicated by reference numeral 702, the processor 420 may display, through the display 440, the visual effect of correcting the background subject 711. When the image in which the foreground subject 713 is corrected is received, as indicated by reference numeral 703, the processor 420 may display, through the display 440, the visual effect of correcting the foreground subject 713.

Figure 8:
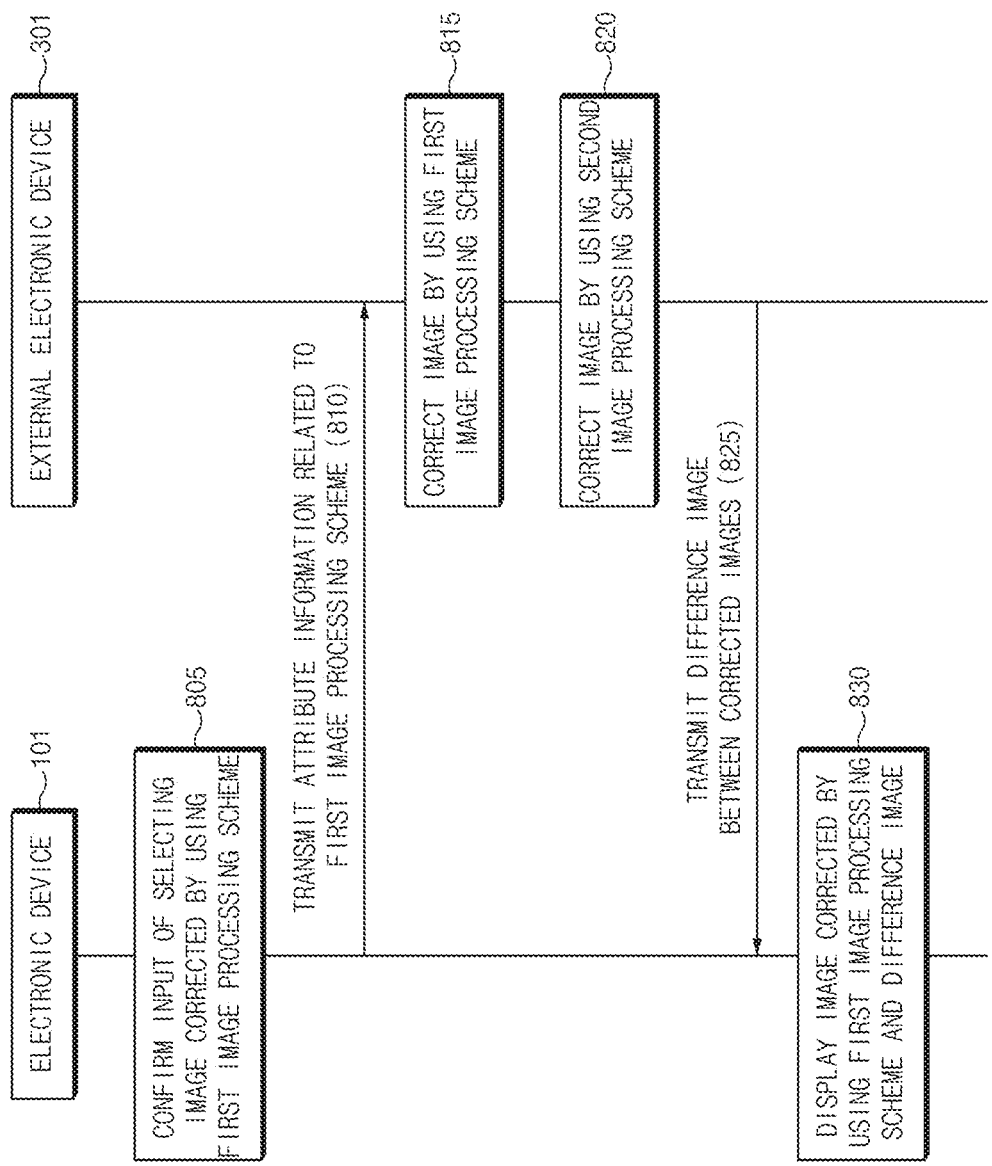
FIG. 8 is a flowchart illustrating an operation of an electronic device and the external electronic device for providing an image by using a difference image between corrected images according to an embodiment of the disclosure.

FIG. 8 is a flowchart illustrating an operation of an electronic device and an external electronic device for providing an image by using a difference image between corrected images according to an embodiment of the disclosure. It may be assumed in FIG. 8 that the processor 460 of the external electronic device 301 supports the first and second image processing schemes. For example, the processor 460 may include a plurality of recognition modules 462, preprocessing units 464, encoders 466, or ISPs 468.

Referring to FIG. 8, in operation 805, the electronic device 101 may confirm a user input of selecting an image corrected by using the first image processing scheme. For example, the user input may include an input of selecting a thumbnail of the image.

In operation 810, the electronic device 101 may transmit the attribute information associated with the first image processing scheme to the external electronic device 301. The attribute information may include an identifier of an image file, a processor version, or metadata of an image.

In operation 815, the external electronic device 301 may correct the image by using the first image processing scheme. In operation 820, the external electronic device 301 may correct the image by using the second image processing scheme. The first and second image processing schemes may be at least partially different from each other. The external electronic device 301 may generate a difference image between the images corrected by using the first and second image processing schemes.

In operation 825, the external electronic device 301 may transmit the differential image between the corrected images to the electronic device 101. When the network connection between the electronic device 101 and the external electronic device 301 is disconnected, the external electronic device 301 may store the difference image in the queue list until the network connection is established again. The external electronic device 301 may delete the image corrected by using the second image processing scheme or the differential image to secure the storage space after transmitting the differential image.

In operation 830, the electronic device 101 may correct the image based on the image corrected by using the first image processing scheme and the difference image, and display the corrected image through the display 440.

As described above, when the external electronic device 301 supports a plurality of image processing schemes, the electronic device 101 may provide the image corrected by using the latest image processing scheme to a user only by receiving the difference image without a need to receive all images corrected by using the second image processing scheme.

Figure 9:
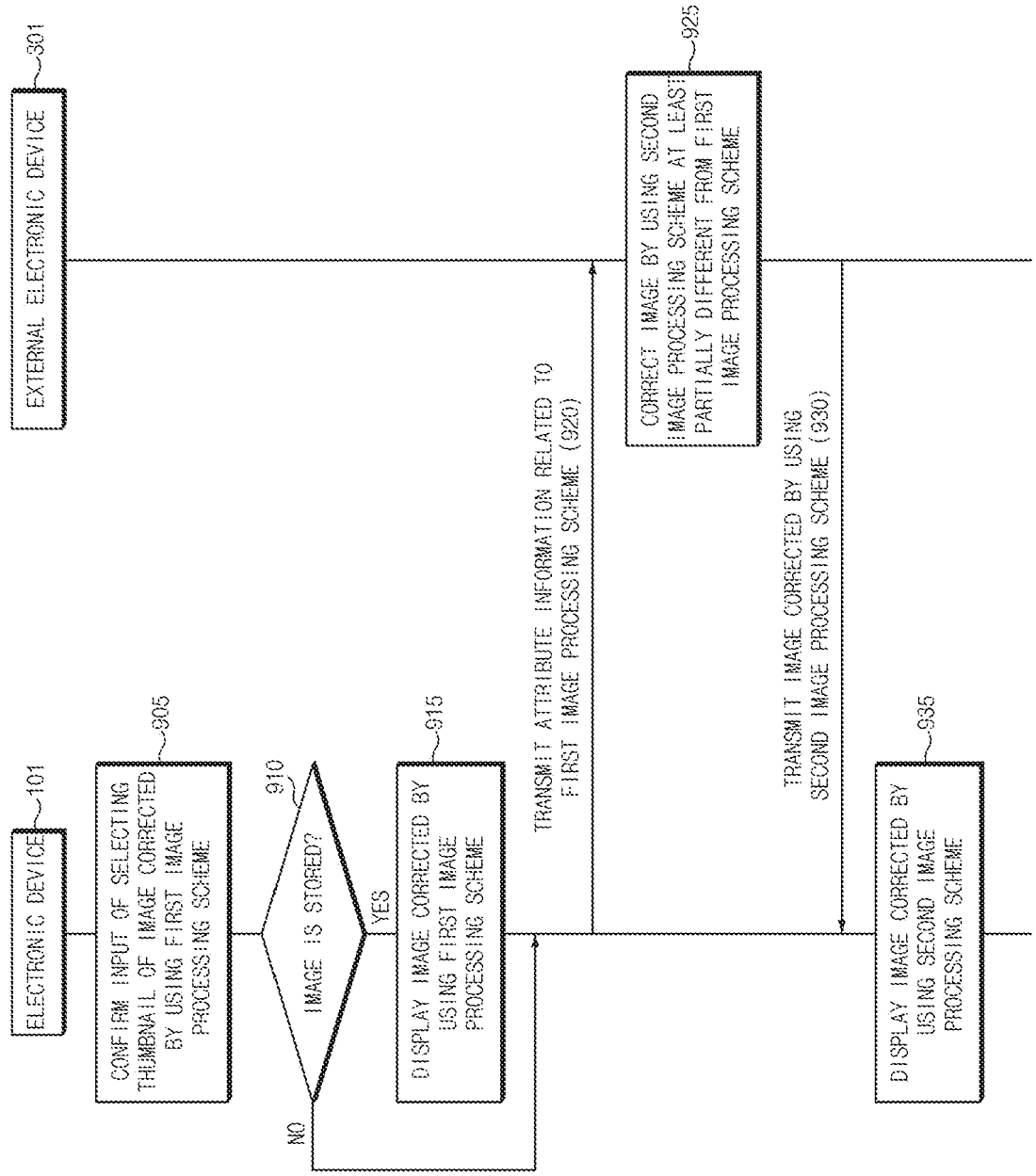
FIG. 9 is a flowchart illustrating an operation of an electronic device and the external electronic device for providing an image corrected according to whether an image is stored in the electronic device according to an embodiment of the disclosure.

FIG. 9 is a flowchart illustrating an operation of an electronic device and an external electronic device for providing an image corrected according to whether an image is stored in the electronic device according to an embodiment of the disclosure.

Referring to FIG. 9, in operation 905, the electronic device 101 may confirm a user input of selecting an image corrected by using the first image processing scheme. For example, the user input may include an input of selecting a thumbnail of the image.

In operation 910, the electronic device 101 may confirm whether an image corresponding to the selected thumbnail is stored therein. When the image corresponding to the selected thumbnail is stored, the electronic device 101 may perform operation 915. When the image corresponding to the selected thumbnail is not stored, the electronic device 101 may perform operation 920 without performing operation 915.

In operation 915, the electronic device 101 may display the image corresponding to the selected thumbnail through the display 440. The image displayed through the display 440 may mean an image corrected by using the first image processing scheme.

In operation 920, the electronic device 101 may transmit the attribute information associated with the first image processing scheme to the external electronic device 301. When the image corresponding to the selected thumbnail is not stored in the electronic device 101, the attribute information may include the identifier of an image file or metadata on the image. When the image corresponding to the selected thumbnail is stored in the electronic device 101, the attribute information may further include information about the type or version of the processor 420 supported by the electronic device 101.

In operation 925, the external electronic device 301 may correct the image by using the second image processing scheme. The external electronic device 301 may select the image requested by the electronic device 101 based on the image file identifier included in the received attribute information, and may correct the selected image by using the second image processing scheme. The external electronic device 301 may correct the image for each segmented image area by using the second image processing scheme.

When the image corresponding to the image file identifier is not stored in the external electronic device 301, the external electronic device 301 may transmit, to the electronic device 101, a message indicating that there is no requested image. When the electronic device 101 receives the message, the electronic device 101 may display, through the display 440, a UI indicating that there is no image corresponding to the selected thumbnail.

In operation 930, the external electronic device 301 may transmit, to the electronic device 101, the image corrected by using the second image processing scheme. When the network connection between the electronic device 101 and the external electronic device 301 is disconnected, the external electronic device 301 may store the corrected image in the queue list until the network connection is established again. The external electronic device 301 may delete the corrected image to secure storage space after transmitting the corrected image.

In operation 935, the electronic device 101 may display, through the display 440, the image corrected by using the second image processing scheme. When the corrected image is received for each segmented image area, the electronic device 101 may display, through the display 440, the effect of correcting the image for each image area.

As described above, the electronic device 101 may provide a user with an environment of securing the storage space of the electronic device 101 and using the latest image processing scheme by receiving the image corrected by the second image processing scheme through the external electronic device 301 without a need to store the image in the electronic device 101.

Figure 10:
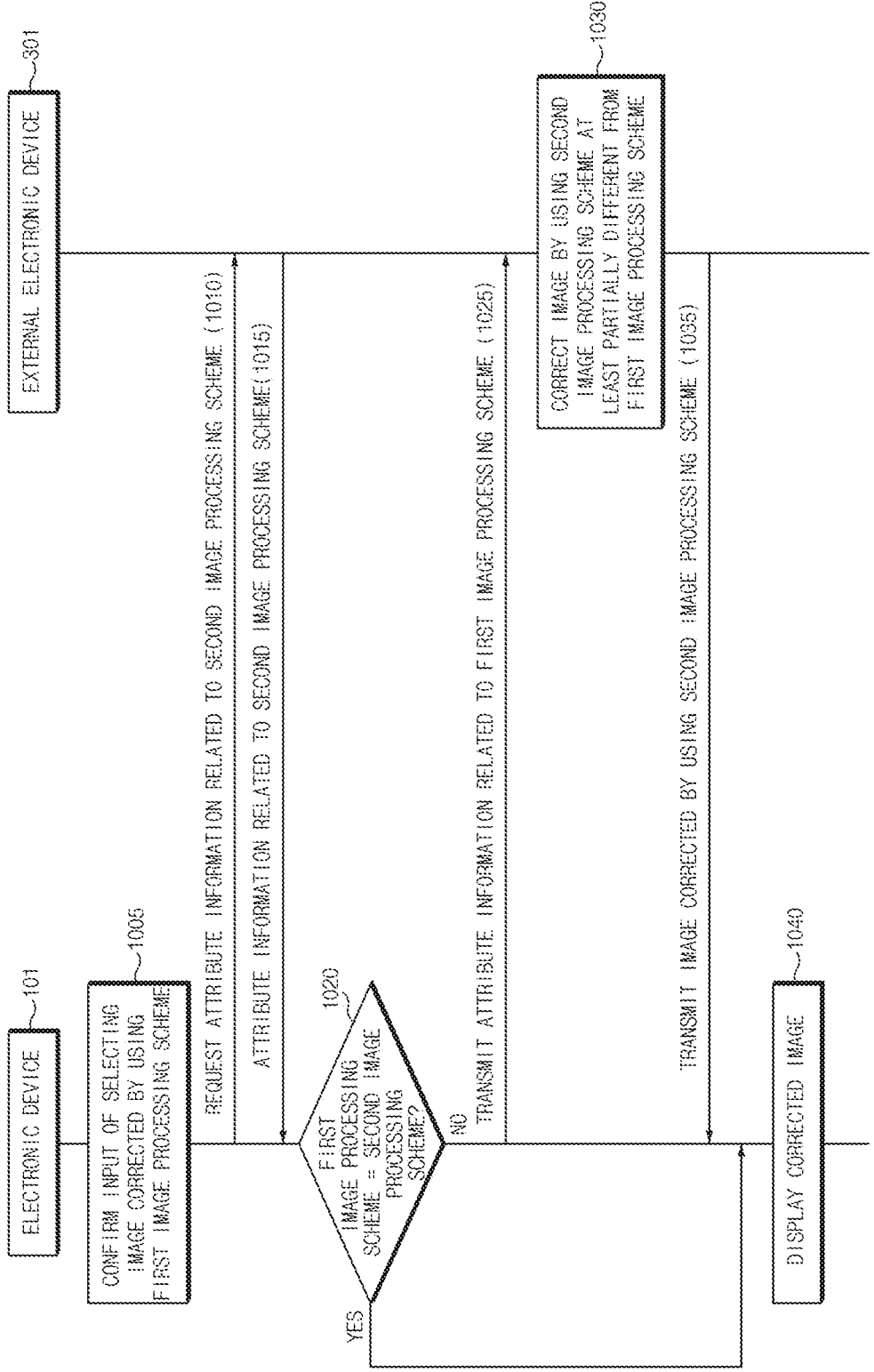
FIG. 10 is a flowchart illustrating a process of providing a corrected image by comparing image processing schemes in an electronic device according to an embodiment of the disclosure.

FIG. 10 is a flowchart illustrating a process of providing a corrected image by comparing image processing schemes in an electronic device according to an embodiment of the disclosure.

Referring to FIG. 10, in operation 1005, the electronic device 101 may confirm a user input of selecting an image corrected by using the first image processing scheme. For example, the image corrected by using the first image processing scheme may be an image in JPEG format.

In operation 1010, the electronic device 101 may transmit, to the external electronic device 301, a message of requesting attribution information associated with the second image processing scheme. The message may include an image file identifier of the image selected by a user input. According to an embodiment, the electronic device 101 may display, through the display 440, a UI for confirming whether to transmit the message before transmitting the message.

In operation 1015, the external electronic device 301 may transmit the attribute information associated with the second image processing scheme to the electronic device 101. For example, the attribute information may include information about the type or version of the ISP supported by the external electronic device 301.

In operation 1020, based on the received attribute information, the electronic device 101 may confirm whether the first image processing scheme supported by the electronic device 101 is the same as the second image processing scheme supported by the external electronic device 301. When the first and second image processing schemes are the same, since the electronic device 101 does not need to receive an image from the external electronic device 301, in operation 1040, the electronic device 101 may display, through the display 440, the image corrected by using the first image processing scheme. When the first and second image processing schemes are at least partially different from each other, the electronic device 101 may perform operations 1025 to 1035 to receive the latest image processing scheme.

In operation 1025, the electronic device 101 may transmit the attribute information associated with the first image processing scheme to the external electronic device 301. For example, the attribute information may include at least one of the identifier of an image file, the metadata on an image, or the type (or version) of an ISP supported by the electronic device 101.

In operation 1030, the external electronic device 301 may correct the image by using the second image processing scheme. The external electronic device 301 may correct the image for each segmented image area by using the second image processing scheme.

In operation 1035, the external electronic device 301 may transmit, to the electronic device 101, the image corrected by using a second image processing scheme. The external electronic device 301 may delete the corrected image to secure storage space after transmitting the corrected image.

In operation 1040, the electronic device 101 may display, through the display 440, the image corrected by using the second image processing scheme. When the corrected image is received for each segmented image area, the electronic device 101 may display, through the display 440, the effect of correcting the image for each image area.

As described above, the electronic device 101 may selectively receive an image from the external electronic device 301 based on the result of comparing the first and second image processing schemes, thereby reducing power or resource consumption caused due to data transmission.

Figure 11:
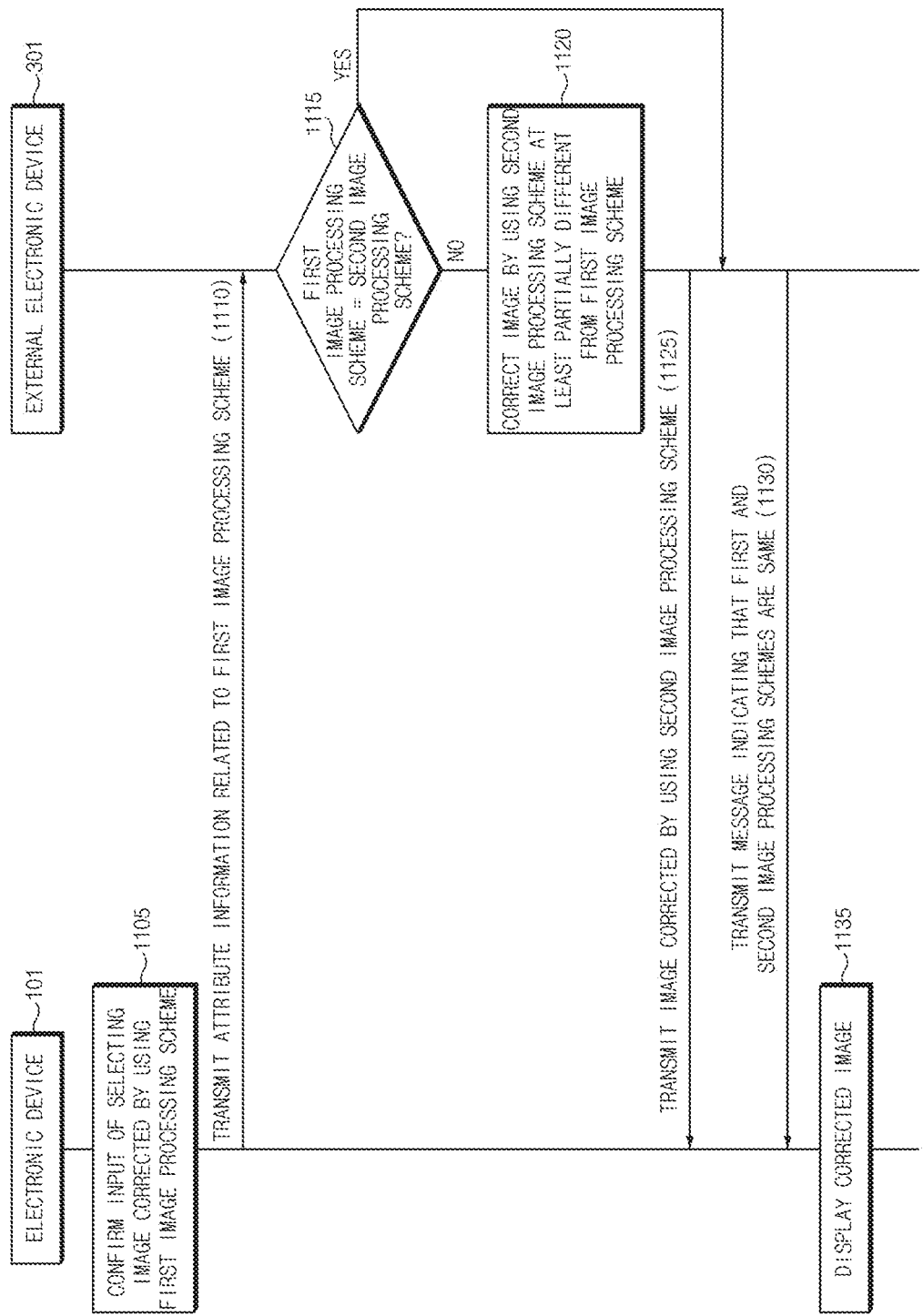
FIG. 11 is a flowchart illustrating an operation of providing a corrected image by comparing image processing schemes in an external electronic device according to an embodiment of the disclosure.

FIG. 11 is a flowchart illustrating an operation of providing a corrected image by comparing image processing schemes in an external electronic device according to an embodiment of the disclosure.

Referring to FIG. 11, in operation 1105, the electronic device 101 may confirm a user input of selecting an image corrected by using the first image processing scheme. In operation 1110, the electronic device 101 may transmit the attribute information associated with the first image processing scheme to the external electronic device 301.

In operation 1115, the external electronic device 301 may confirm whether the first and second image processing schemes are the same. When the first image processing scheme is at least partially different from the second image processing scheme, the electronic device 101 and the external electronic device 301 may perform the same operations as those in the embodiment illustrated in FIG. 3. For example, in operation 1120, the external electronic device 301 may correct the image by using the second image processing scheme, and in operation 1125, may transmit the image corrected by using the second image processing scheme to the electronic device 101. In operation 1135, the electronic device 101 may display, through the display 440, the image corrected by using the second image processing scheme. When the first and second image processing schemes are the same, the external electronic device 301 may perform operation 1130.

In operation 1130, the external electronic device 301 may transmit a message indicating that the first and second image processing schemes are the same. For example, the message may indicate, through flag data, whether the first and second image processing schemes are the same.

In operation 1135, the electronic device 101 may display, through the display 440, the image corrected by using the first image processing scheme.

As described above, when the first and second image processing schemes are the same, the electronic device 101 may prevent the storage space from being reduced by receiving a duplicated image from the external electronic device 301.

Figure 12:
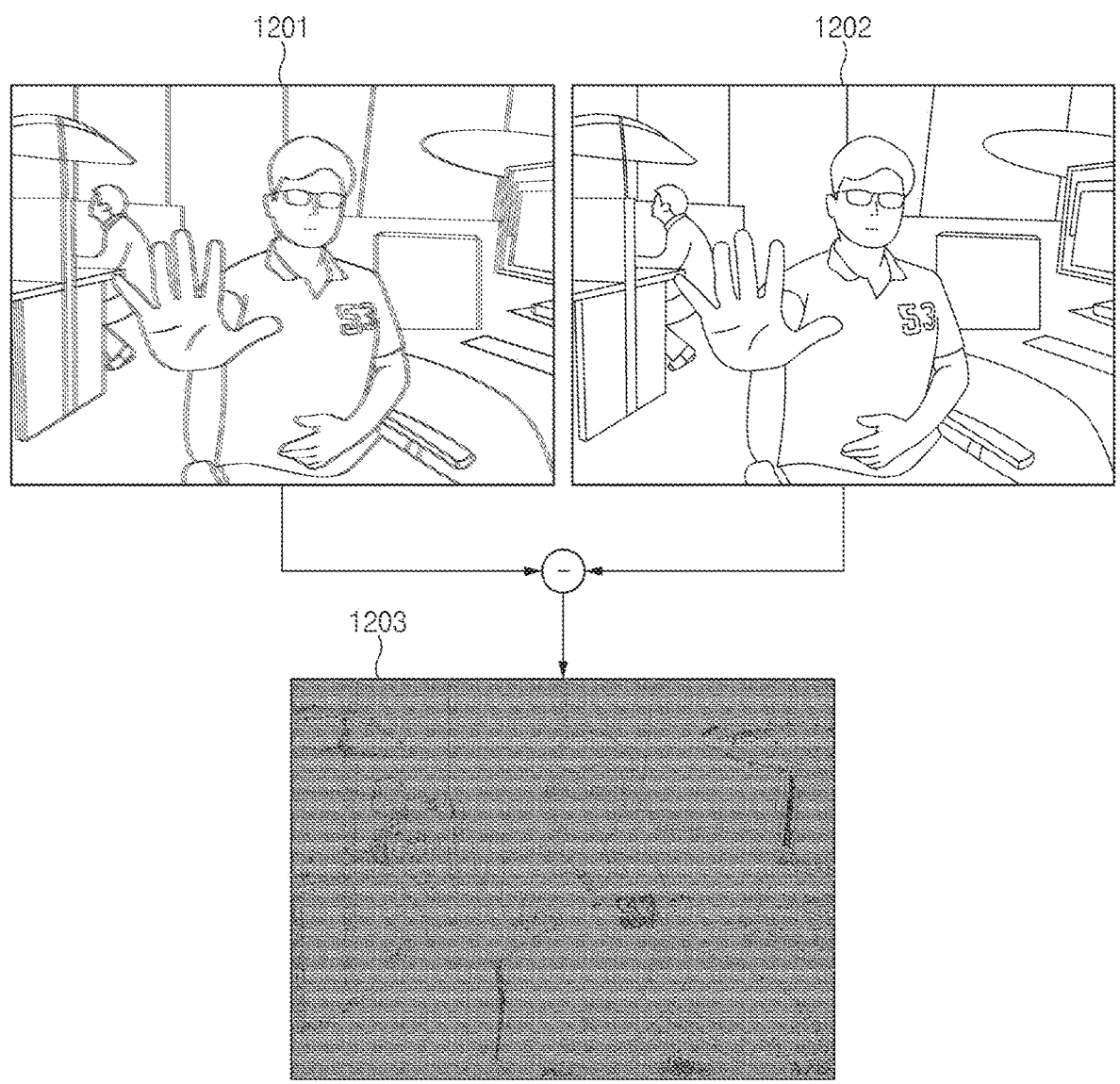
FIG. 12 is a view illustrating a difference image according to an embodiment of the disclosure.

FIG. 12 is a view illustrating a difference image according to an embodiment of the disclosure.

Referring to FIG. 12, a first image 1201 may be an image corrected by using the first image processing scheme. A second image 1202 may be an image corrected by using the second image processing scheme. The external electronic device 301 (or the processor 460) may generate a differential image 1203 by using the difference between the first and second images 1201 and 1202. The external electronic device 301 may transmit only the differential image 1203 to the electronic device 101 without transmitting the second image 1202 to the electronic device 101.

The electronic device 101 (or the processor 420) may generate the second image 1202 by using the received differential image 1203 and the first image 1201. The electronic device 101 may display the second image 1202 through the display 440.

Figure 13:
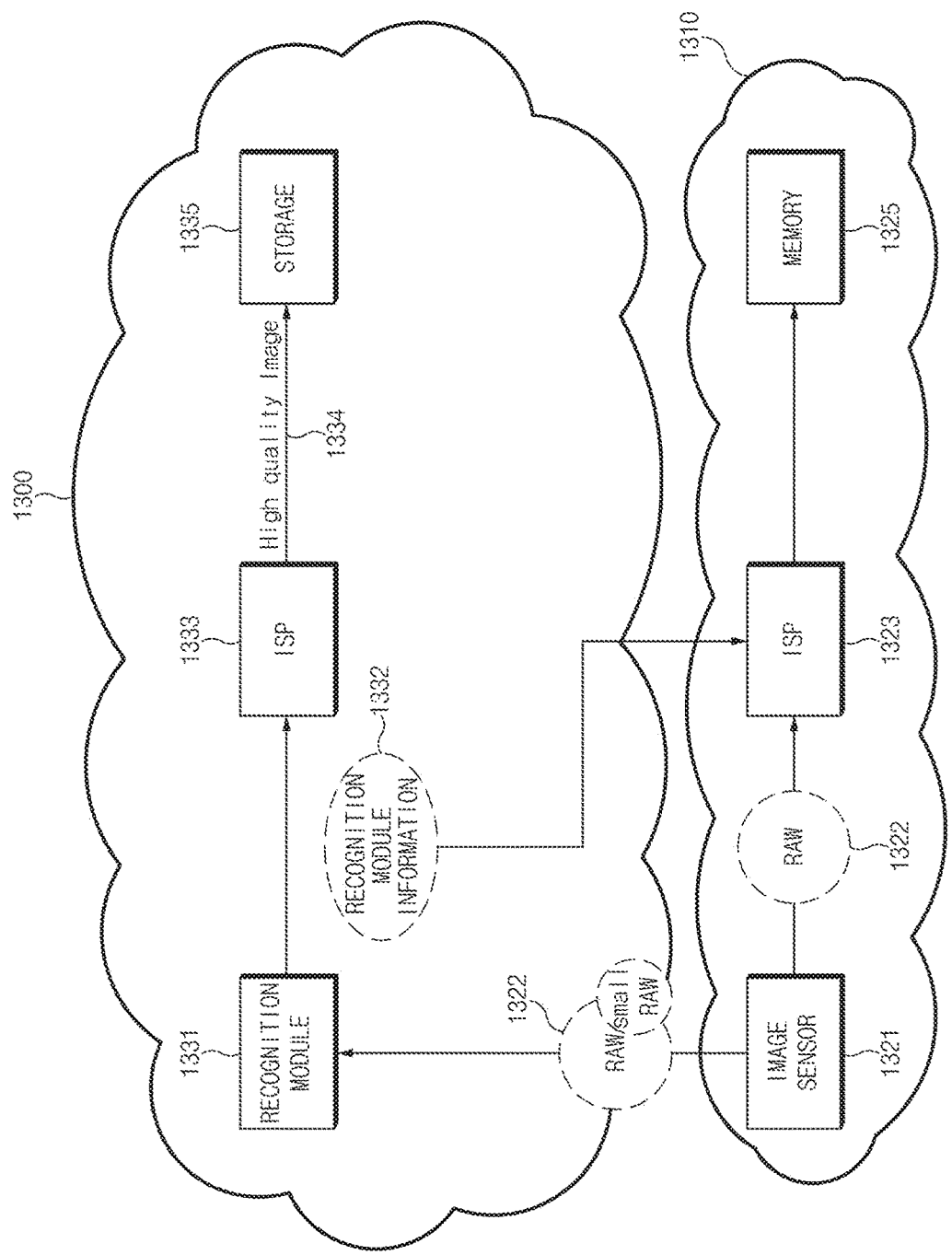
FIG. 13 is a conceptual diagram illustrating the operations of an electronic device and an external electronic device according to an embodiment of the disclosure.

FIG. 13 is a conceptual diagram illustrating the operations of an electronic device and an external electronic device according to an embodiment of the disclosure.

Referring to FIG. 13, the electronic device 1310 (e.g., the electronic device 101 of FIG. 3) may include an image sensor 1321 (e.g., the image sensor 230 or the camera module 180 of FIG. 2), an ISP 1323 (e.g., the processor 420 of FIG. 4), and a memory 1325 (e.g., the memory 430 of FIG. 4). An external electronic device 1300 may include a recognition module 1331 (e.g., the recognition module 462 of FIG. 4), an ISP 1333 (e.g., the processor 460 or the ISP 468 of FIG. 4), and storage 1335 (e.g., the memory 470 of FIG. 4). The recognition module 1331 may be a logic module or may be implemented with a processor of the external electronic device 1300. In addition, the ISP 1333 may be implemented with a processor of the external electronic device 1300. For example, the processor of external electronic device 1300 may perform both recognition and image processing. Although not shown, the electronic device 101 may include a communication module (e.g., the communication module 410 of FIG. 4) capable of transmitting and receiving data to and from the external electronic device 1300. The external electronic device 1300 may include a communication module capable of transmitting and receiving data to and from the electronic device 101.

The image sensor 1321 may obtain an image of an external object and may generate a raw image 1322 corresponding to the image. The image sensor 1321 may transfer the raw image 1322 to the ISP 1323. The image sensor 1321 may generate a small raw image and transmit the small raw image to the external electronic device 1300 through the communication module. The processor of the electronic device 101 rather than the image sensor 1321 may generate the small raw image, and transmit the generated small raw image to the external electronic device 1300. The image sensor 1321 may transmit the raw image 1322 in a compressed state to the ISP or the external electronic device 1300. The image sensor 1321 may compress the raw image 1322 and store it in a memory within the image sensor 1321 to partially process the raw image 1322. The recognition module 1331 of the external electronic device 1300 may obtain the small raw image through the communication module and segment at least one image area from the small raw image. The recognition module 1331 may recognize each of at least one image region segmented by the segmentation result. The information associated with a plurality of image areas, for example, correction information 1332 including at least one of coordinate information or recognition results of the image area may be generated from the recognition module 1331. The correction area information 1332 may be transmitted to the electronic device 101. The ISP 1323 may correct the raw image 1322 by using the correction area information 1332 (e.g., image correction according to the first image processing scheme), so that a corrected image may be generated. The corrected image may be, for example, in the YUV format. The corrected image may be stored in the memory 1325. Alternatively, the corrected image may be compressed, for example, in accordance with the JPEG scheme, and the compressed image may be stored in the memory 1325.

The raw image 1322 provided from the image sensor 1321 may be transmitted to the external electronic device 1300 separately from the small raw image. Since the raw image 1322 is larger in capacity than the small raw image, the small raw image may be first transmitted to the external electronic device 1300 and then the raw image 1322 may be transmitted to the external electronic device 1300. For example, while the ISP 1323 corrects the raw image 1322, the raw image 1322 may be transmitted to the external electronic device 1300. The raw image 1322 may be uploaded to the external electronic device 1300 as generated by the image sensor 1321, or a preprocessed image, on which lens distortion compensation or noise removal is performed, may be uploaded. The above-described preprocessing may be performed in the external electronic device 1300. The external electronic device 1300 may perform de-mosaic processing or image format modification, or preprocessing for increasing an image recognition rate. The ISP 1333 of the external electronic device 1300 may correct the received raw image 1322. The external electronic device 1300 may correct the raw image 1322 by using the correction area information 1332 that has been generated previously or may correct the raw image 1322 by using extended correction area information. The raw image 1322 may have a higher resolution than the small raw image so that the ISP 1333 of the external electronic device 1300 may obtain more detailed extended correction area information from a high-resolution image. The ISP 1333 may generate the extended correction area information by using the previously generated correction area information and the raw image 1322 together. The ISP 1333 may obtain a high quality image 1334 by correcting the raw image 1322 using the extended correction area information. The high quality image 1334 may be stored in the storage 1335 of the external electronic device 1300 and downloaded to the electronic device 101.

As described above, an electronic device (e.g., the electronic device 101 of FIG. 1) may include a communication module (e.g., the communication module 410 of FIG. 4), a memory (e.g., the memory 430 of FIG. 4), a display (e.g., the display 440 of FIG. 4), and a processor (e.g., the processor 420 of FIG. 4), wherein the processor may be configured to confirm a user input related to selection of an image corrected by using a first image processing scheme, transmit attribute information related to the first image processing scheme to an external electronic device through the communication module, based on the user input, receive, from the external electronic device through the communication module, the image corrected by using a second image processing scheme selected based on the attribute information in the external electronic device, and display, through the display, the image corrected by using the second image processing scheme.

The attribute information may include a type of the processor, an identifier of the image, or metadata on the image, and the processor may be configured to transmit the attribute information to the external electronic device to determine the second image processing scheme based at least on the type of the processor, the identifier of the image, or the metadata on the image.

The processor may be configured to receive, through the communication module, at least a segment of the image segmented and corrected by using the second image processing scheme, and display the image corrected by using the received segment and the first image processing scheme.

The processor may be configured to request second attribute information related to the second image processing scheme from the external electronic device through the communication module in response to the user input, receive the second attribute information from the external electronic device through the communication module, determine a difference between the first and second image processing schemes based on a comparison between the attribute information and the second attribute information, and transmit, through the communication module, at least a part of a first attribute information to the external electronic device when the difference meets a specified condition.

The processor may be configured to receive a difference image between the images corrected by using the first and second image processing schemes from the external electronic device through the communication module, and display, through the display, the image corrected by using the first image processing scheme and an image corrected by using the difference image.

The processor may be configured to determine whether the image is stored in the memory in response to the user input, display the image corrected by using the first image processing scheme when the image is stored in the memory, and display an effect related to the correction through the display when the image corrected by using the second image processing scheme is received.

The processor may be configured to request the image from the external electronic device through the communication module when the image is not stored in the memory, and display, through the display, a screen indicating that the image does not exist when a message indicating that the image does not exist is received from the external electronic device.

The external electronic device may include a cloud server, and the processor may be configured to obtain a raw image of the image through an image sensor of the electronic device, and transmit the raw image to the cloud server through the communication module.

As described above, an electronic device (e.g., the electronic device 101 of FIG. 1) may include a communication module (e.g., the communication module 410 of FIG. 4), a memory (e.g., the memory 430 of FIG. 4), a display (e.g., the display 440 of FIG. 4), and a processor (e.g., the processor 420 of FIG. 4), wherein the processor may be configured to confirm an input related to selection of an image corrected by using a first image processing scheme, transmit attribute information related to the first image processing scheme to the external electronic device through the communication module to determine whether the external electronic device is capable of correcting the image by using a second image processing scheme at least partially different from the first image processing scheme based on the attribute information, receive, from the external electronic device through the communication module, at least a part of the image corrected by using a second image processing scheme, based on the determination that the external electronic device is capable of correcting the image by using the second image processing scheme, and display, through the display, the image corrected by using the second image processing scheme.

The attribute information may include a type of the processor, an identifier of the image, or metadata on the image.

The processor may be configured to receive the image corrected by using the second image processing scheme through the communication module for each segmented image area, and display, through the display, the image corrected by using the second image processing scheme for each segmented image area.

The processor may be configured to request attribute information related to the second image processing scheme from the external electronic device through the communication module in response to the user input, receive the attribute information related to the second image processing scheme from the external electronic device through the communication module, and transmit, to the external electronic device through the communication module, the attribute information related to the first image processing scheme when the attribute information related to the first image processing scheme is at least partially different from the attribute information related to the second image processing scheme.

The processor may be configured to receive a difference image between the images corrected by using the first and second image processing schemes from the external electronic device through the communication module, and display, through the display, the image corrected by using the first image processing scheme and an image corrected by using the difference image.

The processor may be configured to determine whether the image is stored in the memory in response to the user input, display the image corrected by using the first image processing scheme when the image is stored in the memory, and display an effect of correcting the image by using the second image processing scheme through the display when the image corrected by using the second image processing scheme is received.

The processor may be configured to request the image from the external electronic device through the communication module when the image is not stored in the memory, and display, through the display, a screen indicating that the image does not exist when a message indicating that the image does not exist is received from the external electronic device.

As described above, an external electronic device (e.g., the external electronic device 301 of FIG. 3) may include a memory (e.g., the memory 470 of FIG. 4), and a processor (e.g., the processor 460 of FIG. 4). The processor may be configured to receive attribute information related to a first image processing scheme from an electronic device (e.g., the electronic device 101 of FIG. 3), correct an image by using a second image processing scheme based on the attribute information, and transmit the image corrected by using the second image processing scheme to the electronic device, wherein the first and second image processing schemes may be based on a type of an ISP for correcting the image.

The processor may be configured to correct the image for each segmented image area, and transmit the image corrected by using the second image processing scheme for each segmented image area.

The processor may be configured to correct the image by using the first image processing scheme, correct the image by using the second image processing scheme, generate a difference image between the images corrected by the first and second image processing schemes, and transmit the difference image to the electronic device.

The external electronic device may include a cloud server.

The processor may be configured to receive a message of requesting second attribute information related to the second image processing scheme, and transmit the second attribute information to the electronic device.

The electronic device according to various embodiments of the present disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

According to various embodiments of the disclosure, the electronic device may receive the image corrected by the image processing scheme of the external electronic device from the external electronic device, so that it is possible to provide a user with an image to which an advanced image processing scheme is applied without replacing a hardware device of the electronic device.

According to various embodiments of the disclosure, the electronic device may provide a user with the effect of correcting an image by an image area by receiving the image corrected by the image processing scheme of an external electronic device for each segmented image area.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

What is claimed is:

1. An electronic device comprising:
    a communication module;
    a memory;
    a display; and
    a processor,
    wherein the processor is configured to:
        confirm a user input related to a selection of a first image corrected by using a first image processing scheme,
        in response to the user input, request from an external electronic device through the communication module, second attribute information related to a second image processing scheme,
        receive, from the external electronic device through the communication module, the second attribute information,
        determine a difference between the first and second image processing schemes based on a comparison between attribute information related to the first image processing scheme and the second attribute information,
        transmit, to the external electronic device through the communication module, the attribute information related to the first image processing scheme when the difference meets a specified condition,
        receive, from the external electronic device through the communication module, a second image corrected by using the second image processing scheme selected based on the attribute information related to the first image processing scheme in the external electronic device, the received second image corresponding to the selected first image, and
        display, through the display, a third image corresponding to the selected first image,
    wherein the third image is an image corrected based on at least one of the first image processing scheme or the second image processing scheme.

2. The electronic device of claim 1,
    wherein the attribute information comprises a type of the processor, an identifier of the selected first image, or metadata on the first image corrected by using the first image processing scheme, and
    wherein the processor is further configured to transmit the attribute information to the external electronic device to determine the second image processing scheme based at least on the type of the processor, the identifier of the selected first image, or the metadata on the first image corrected by using the first image processing scheme.

3. The electronic device of claim 1,
wherein, to receive the second image corrected by using the second image processing scheme, the processor is further configured to receive a segment of a plurality of segments of the second image generated by the second image processing scheme, and
wherein, to display the third image, the processor is further configured to display an image corresponding to the selected first image corrected based on the received segment and the first image corrected by using the first image processing scheme.

4. The electronic device of claim 1,
wherein the processor is further configured to receive a difference image between the first image corrected by using the first image processing scheme and the second image corrected by using the second image processing scheme from the external electronic device through the communication module, and
wherein, to display the third image, the processor is further configured to display an image corresponding to the selected first image corrected based on the first image corrected by using the first image processing scheme and the difference image.

5. The electronic device of claim 1,
wherein the processor is further configured to determine whether the first image corrected by using the first image processing scheme is stored in the memory in response to the user input, and
wherein, to display the third image, the processor is further configured to:
display the first image corrected by using the first image processing scheme when the first image corrected by using the first image processing scheme is stored in the memory, and
display an effect related to a correction through the display when the second image corrected by using the second image processing scheme is received.

6. The electronic device of claim 5, wherein the processor is further configured to:
request the selected first image from the external electronic device through the communication module when the first image corrected by using the first image processing scheme is not stored in the memory, and
display, through the display, a screen indicating that the selected first image does not exist when a message indicating that the selected first image does not exist is received from the external electronic device.

7. The electronic device of claim 1,
wherein the external electronic device comprises a cloud server, and
wherein the processor is further configured to:
obtain a raw image of the selected first image through an image sensor of the electronic device, and
transmit the raw image to the cloud server through the communication module.

8. An electronic device comprising:
a communication module;
a memory;
a display; and
a processor,
wherein the processor is configured to:
confirm an input related to selection of an image corrected by using a first image processing scheme,
in response to the input, request from an external electronic device through the communication module, attribute information related to a second image processing scheme,
receive, from the external electronic device through the communication module, the attribute information related to the second image processing scheme,
transmit, to the external electronic device through the communication module, attribute information related to the first image processing scheme, to determine whether the external electronic device is capable of correcting, by using the second image processing scheme at least partially different from the first image processing scheme, an original image corresponding to the image corrected by using the first image processing scheme, when the attribute information related to the first image processing scheme is at least partially different from the attribute information related to the second image processing scheme,
receive, from the external electronic device through the communication module, at least a part of the original image corrected by using the second image processing scheme, based on the determination that the external electronic device is capable of correcting the original image by using the second image processing scheme, and
display, through the display, the image corrected by using the second image processing scheme.

9. The electronic device of claim 8, wherein the attribute information comprises a type of the processor, an identifier of the original image, or metadata on the original image.

10. The electronic device of claim 8, wherein the processor is further configured to:
receive the image corrected by using the second image processing scheme through the communication module for each segmented image area, and
display, through the display, the image corrected by using the second image processing scheme for each segmented image area.

11. The electronic device of claim 8, wherein the processor is further configured to:
receive a difference image between the images corrected by using the first and second image processing schemes from the external electronic device through the communication module, and
display, through the display, the image corrected by using the first image processing scheme and an image corrected by using the difference image.

12. The electronic device of claim 8, wherein the processor is further configured to:
determine whether the image corrected by the using the first image processing scheme is stored in the memory in response to a user input,
display the image corrected by using the first image processing scheme when the image corrected by using the first image processing scheme is stored in the memory, and
display an effect of correcting the image by using the second image processing scheme through the display when the image corrected by using the second image processing scheme is received.

13. The electronic device of claim 8, wherein the processor is further configured to:
request the original image from the external electronic device through the communication module when the original image is not stored in the memory, and display, through the display, a screen indicating that the image does not exist when a message indicating that the original image does not exist is received from the external electronic device.

14. An external electronic device comprising:
a communication module;
a memory; and
a processor,
wherein the processor is configured to:
  receive, from an electronic device through the communication module, a request for second attribute information related to a second image processing scheme,
  transmit, to the electronic device through the communication module, the second attribute information,
  receive attribute information related to a first image processing scheme from the electronic device, wherein the attribute information is transmitted from the electronic device when the electronic device identifies that a difference between the first and second image processing schemes based on a comparison between the attribute information and the second attribute information meets a specified condition,
  correct an original image by using the second image processing scheme selected based on the attribute information, and
  transmit the image corrected by using the second image processing scheme to the electronic device, and
  wherein the first and second image processing schemes are based on a type of an image signal processor (ISP) for correcting the original image.

15. The external electronic device of claim 14, wherein the processor is further configured to:
  correct the original image for each segmented image area, and
  transmit the image corrected by using the second image processing scheme for each segmented image area.

16. The external electronic device of claim 15, wherein the processor is further configured to:
  correct the original image by using the first image processing scheme,
  correct the original image by using the second image processing scheme,
  generate a difference image between the images corrected by the first and second image processing schemes, and
  transmit the difference image to the electronic device.

17. The external electronic device of claim 14, wherein the external electronic device comprises a cloud server.

* * * * *